United States Patent
McNamara et al.

(10) Patent No.: US 7,462,955 B2
(45) Date of Patent: Dec. 9, 2008

(54) ELECTRICAL POWER DISTRIBUTION SYSTEM AND METHOD THEREOF

(75) Inventors: James L. McNamara, Norwich, VT (US); E. Michael Skroski, Warren, VT (US); Jan Tierson, Moretown, VT (US); Jeffrey K. Petter, Williston, VT (US)

(73) Assignee: Northern Power Systems, Inc., Barre, VT (US)

( * ) Notice: Subject to any disclaimer, the term of this patent is extended or adjusted under 35 U.S.C. 154(b) by 0 days.

(21) Appl. No.: 11/770,148

(22) Filed: Jun. 28, 2007

(65) Prior Publication Data

US 2008/0018175 A1 Jan. 24, 2008

Related U.S. Application Data

(63) Continuation of application No. 10/950,943, filed on Sep. 27, 2004, now abandoned.

(51) Int. Cl.
*H02J 7/00* (2006.01)
(52) U.S. Cl. ....................................................... 307/64

(58) Field of Classification Search ................... 307/43, 307/64
See application file for complete search history.

(56) References Cited

U.S. PATENT DOCUMENTS

| | | | | |
|---|---|---|---|---|
| 5,994,795 | A * | 11/1999 | Gabillet | 307/66 |
| 6,737,762 | B2 * | 5/2004 | Koenig | 307/48 |
| 2002/0036430 | A1 * | 3/2002 | Welches et al. | 307/18 |
| 2004/0066094 | A1 * | 4/2004 | Suzuki et al. | 307/18 |
| 2005/0012395 | A1 * | 1/2005 | Eckroad et al. | 307/44 |

* cited by examiner

Primary Examiner—Robert L. Deberadinis
(74) Attorney, Agent, or Firm—Cantor Colburn, LLP

(57) ABSTRACT

A system for providing auxiliary electrical power is provided. The system includes a plurality of loads and a plurality of power sources, each providing electrical power to one or more of the plurality of loads. At least one generator is electrically connected to the plurality of loads. Also, a plurality of power converters, each of the plurality of power converters being electrically connected between the at least one generator and one of the plurality of loads. An arrangement is also provided for increasing the reliability of power to a load through a connection with a parallel utility network.

34 Claims, 8 Drawing Sheets

FIGURE 7
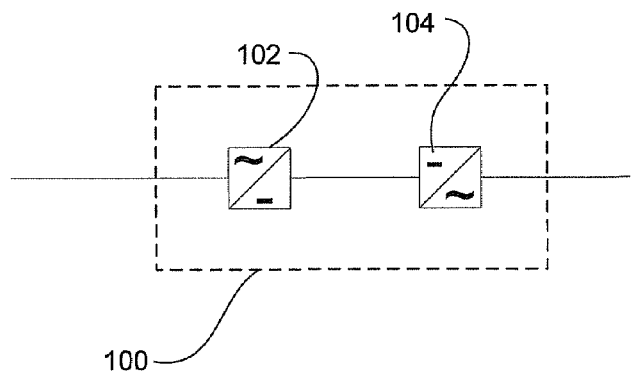
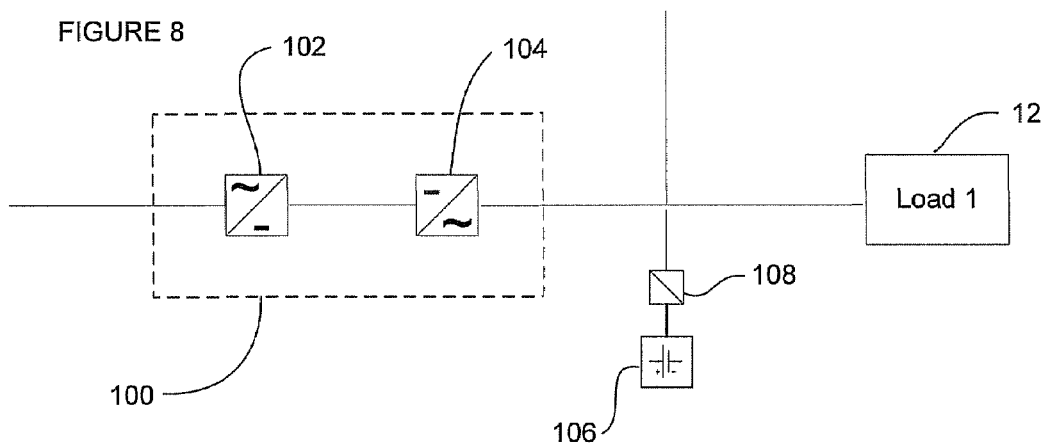
FIGURE 8

ELECTRICAL POWER DISTRIBUTION SYSTEM AND METHOD THEREOF

CROSS REFERENCE TO RELATED APPLICATIONS

This application is a continuation of U.S. patent application Ser. No. 10/950,943 filed on Sep. 27, 2004 which is incorporated by reference in its entirety.

FIELD OF INVENTION

This disclosure relates generally to a system for providing a combined heat and power functionality to a facility and especially to a system for a facility having multiple utility services and a common electrical generation system in parallel with the utility services.

BACKGROUND OF THE INVENTION

A facility which uses a combined heat and power system (hereinafter referred to as "CHP"), or cogeneration, uses a single process to simultaneously produce both thermal energy and electrical power from a single fuel source. A typical CHP system utilizes one or more prime movers, such as a diesel engine, to drive an electrical generator. Heat which results from the generation of electricity is reclaimed and then used for other purposes such as community heating or industrial processes. Users of CHP systems can achieve dramatic increases in energy efficiency, in some cases doubling the efficiency of the system. CHP systems also provide a means for providing auxiliary power to the facility which they can use to support the facility in the event of a power failure.

Most facilities which utilize CHP also receive electrical power from a utility company which transmits electrical power to end users through dedicated utility grids from the point of production at large power plants. Due to the long distances involved in the transmission of power, as well as unexpected increases in demands placed on the utility, end users often face power quality and reliability issues. These power quality issues range from conditions such as undervoltage (sags), voltage spikes, surges, overvoltage, and noise to complete power failure. When power quality and reliability are of great importance to the end user, they often rely on uninterruptible power supplies (UPS) to provide continuous power to meet the user's needs. UPS systems range in size and functionality, however most involve some type of energy storage device, such as a battery, which provides electricity through an inverter to power the load. In the event of a power grid interruption, a UPS will provide short duration conditioned power to the user through the energy storage device. In the event that the power outage last for more than several moments, some form of on-site generated power, such as a generator powered by a reciprocating engine, is engaged to provide the conditioned power before the stored energy is depleted.

Commonly, uninterrupted power involves the coupling of the UPS system with automatic transfer switches and other components including energy storage, power generation, power converters, switches, utility interfaces, and interfaces with the end user load. In facility's which utilize multiple metered electric utility services from the utility grid, this complexity is multiplied since traditionally, each utility feed required its own dedicated UPS or CHP system. Since generation equipment is available in only discrete size ranges, the combining of devices often requires over sizing of equipment for any individual utility feed in the multi-utility service facility. The use of discrete UPS and CHP systems also results in substantial wiring between the components, increasing the potential for incompatibilities and non-ideal system performance.

While existing auxiliary power systems are suitable for their intended purposes, there still remains a need for improvements in providing auxiliary power to end users that allows them to achieve the levels of power quality, efficiency and reliability required for their loads. In particular, a need exists for a topology for an auxiliary power system that provides a single on-site generating asset and central heat recovery system.

SUMMARY OF THE INVENTION

The present invention provides a system for generating electrical power in parallel with at least one utility to a facility having multiple loads with different electrical characteristics. The system further includes multiple power converters that control flow of electrical power to the loads and a method for reclaiming heat generated by the electrical power production for use in the facility.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike:

FIG. 7 is a schematic illustration of an alternate embodiment power converter.

FIG. 8 is a schematic illustration of an alternate embodiment energy storage arrangement for increasing power quality at a load.

DESCRIPTION OF PREFERRED EMBODIMENT

Traditionally, electrical power distribution and service was provided by a single utility which would provide all services required by a user, from the generation of the electricity, to the maintaining of the electrical grid. As the electrical power industry was deregulated, complexities often arose as consumers were allowed to purchase electricity from multiple suppliers while at the same time, their power needs were increasing. As a result, in large facilities, it has become common for multiple electrical service entrances to be connected to the facility. Occasionally the facility will also be fed electricity from different utility suppliers as well. As used herein, a facility means a single building, or a series of buildings such as a farm or office park, which are geographically located in close proximity to each other, typically being located less than five miles apart and preferably less than one mile apart.

Figure 1:
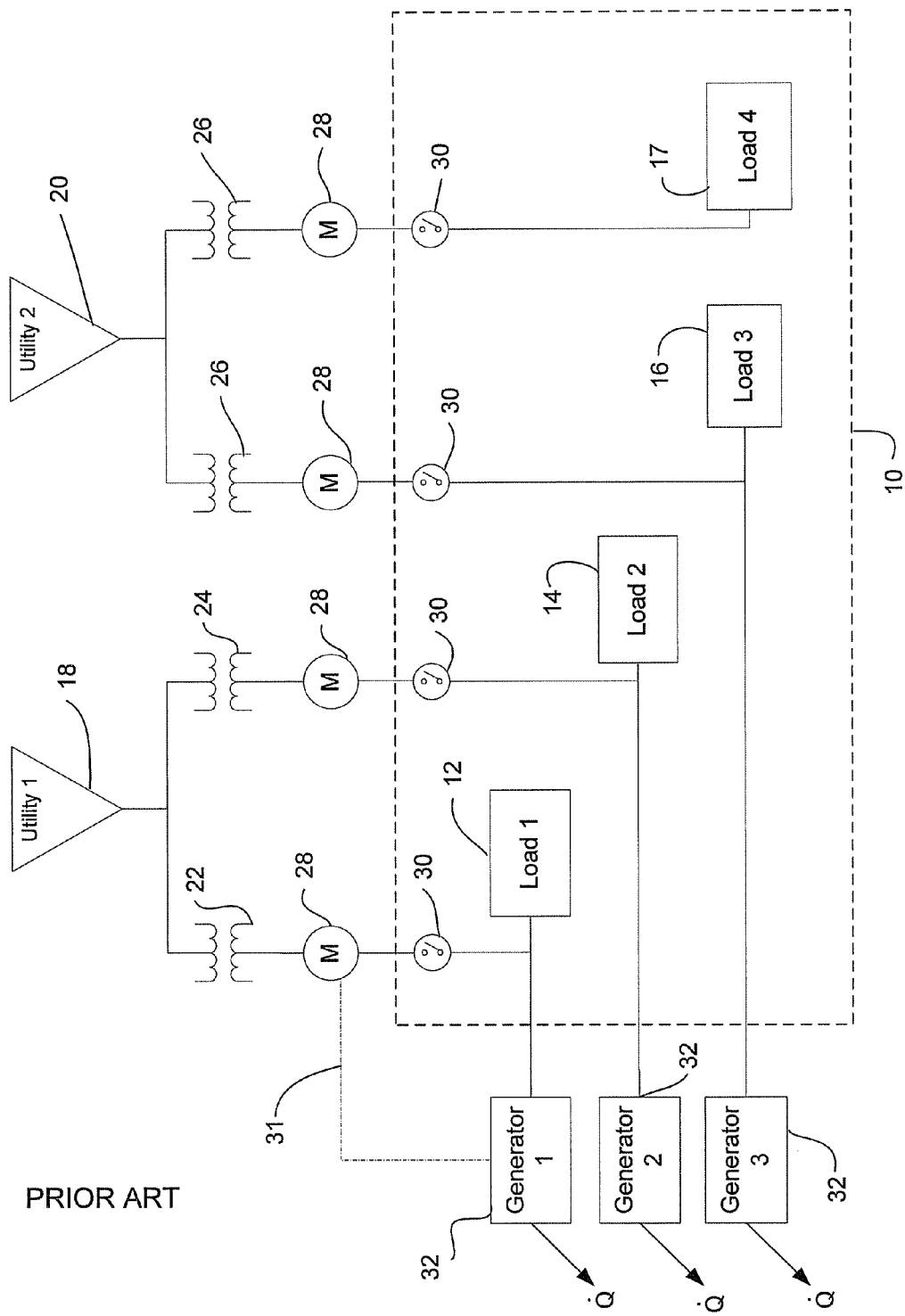
FIG. 1 is a schematic illustration of a prior art facility having a single auxiliary generator for each utility service.

A typical facility having multiple utility service entrances is shown in FIG. 1. Here, the facility 10 contains multiple independent loads 12, 14, 16 being provided power from several utilities 18, 20. The utilities provide power to a transformers 22, 24, 26 which adapt the utility power to a form usable by the particular loads 12, 14, 16. It should be appreciated that each of the loads may have different electrical power needs, for example, load 12 may require 120V single phase power while load 16 may need 480V three-phase power. After the electrical power is transformed, it passes through a meter 28 to the respective loads. An optional disconnect switch 30 is utilized in some applications to prevent flow of electricity back into the utility 18 in the event of a utility power failure. Due to costs involved in maintaining, sizing and installing a generator to support the entire facility 10, it is often difficult to economically justify connecting loads, such as load 17, to an auxiliary distribution bus. Therefore, in the event of power quality issues or power failure from the utility 20, the load 17 would not be supported. Additionally, even if the multiple electrical services have nominally the same electrical characteristics, due to power flow and protection issues, a single generator may not be directly connected to the multiple services.

Since reliability of electrical service is often critical to the operation of a business, it is not uncommon for each of the loads 12, 14, 16 to be connected to an auxiliary generators 32, 33, 34 to provide electricity to the loads 12, 14, 16 and/or heat to the facility 10. In general, for CHP applications, a communications link 31 allows the generators 32 to synchronize with the utility 18, 20 and run continuously to provide electrical power and thermal energy to the facility 10 without feeding power back onto the utility grid. In the event that the the electrical demand for the facility 10 is less than the capacity of the generator 32, the generator is operated at reduced rate. In the event that primary power from the utility was lost, typically the generators 32 will be disabled to prevent flow of electrical power back into the utility 18, 20. Alternatively, where the optional disconnect switch 30 is installed, the switch 30 would open, isolating the load 12, 14, 16 from the utilities 18, 20. The generators 32, 33, 34 could then provide electrical power to the loads 12, 14, 16 without danger of feeding electricity back onto the utility while the utility is being repaired. With the disconnect switch 30 installed, the system also operates to provide auxiliary or emergency backup power.

Since each of the loads 12, 14, 16 have different electrical sources 18, 20, each load required the installation of a dedicated generator 32, 33, 34 which was sized appropriately to meet the needs of the loads 12, 14, 16. As generator systems are typically manufactured in a discrete power ranges, generators used in the auxiliary power systems were often oversized in order to guarantee that sufficient power was available to the supported load. As a result, excess capacity was often installed in the auxiliary power system which was not accessible by any loads other than the one which it was directly connected to. Additionally, the use of individual generators utilized space that could be used for other more value-added business purposes.

Figure 2:
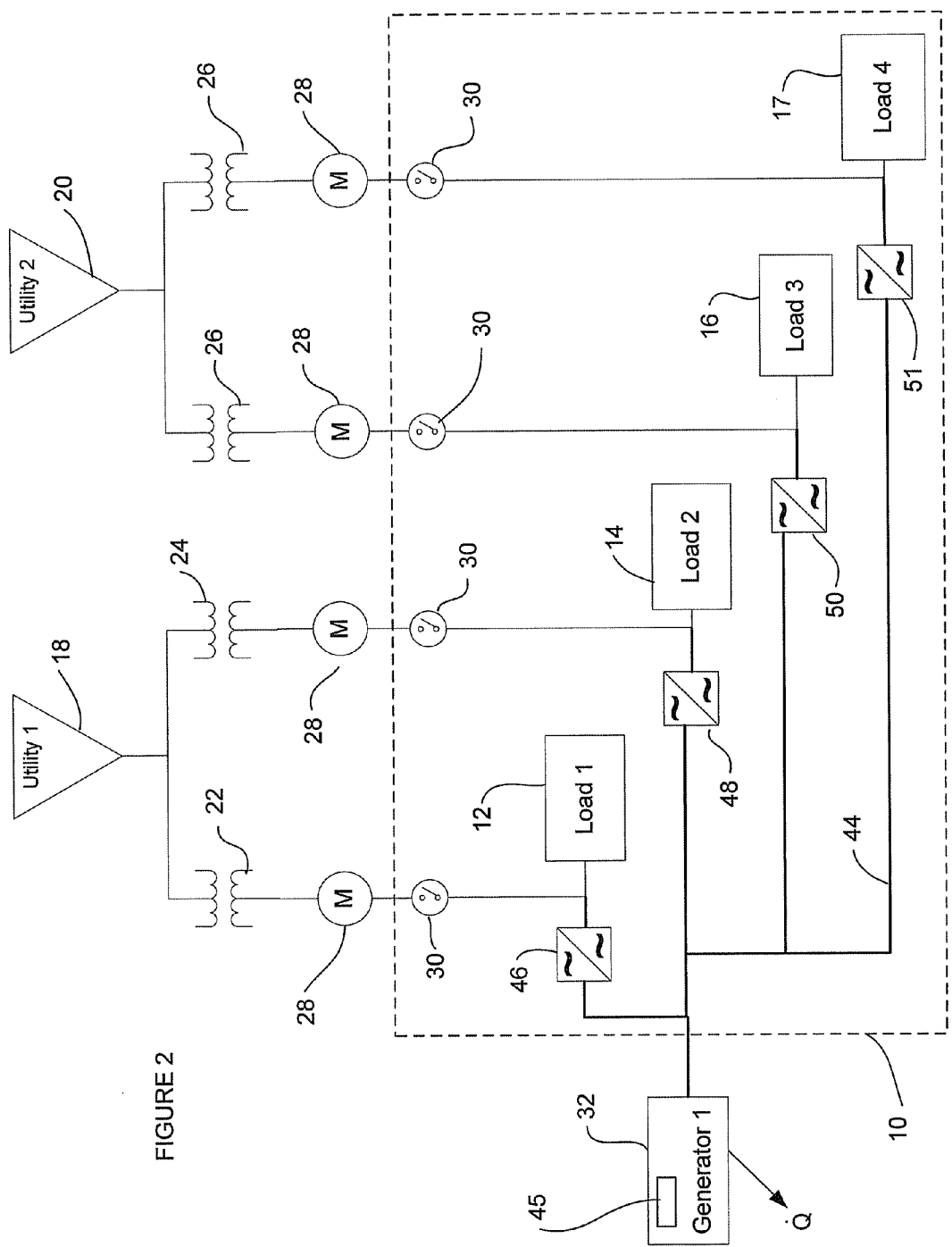
FIG. 2 is a schematic illustration of the present invention utilizing a single auxiliary generator to provide power to multiple independent loads.

The exemplary embodiment of the present invention is shown in FIG. 2. In this embodiment, the power system 40 utilizes a single power source or generator 42 to provide electrical power to multiple loads 12, 14, 16, 17 via auxiliary electrical distribution bus 44. As will be described in more detail herein, the electrical distribution bus 44 includes power conversion devices 46, 48, 50, 51 that control the flow of power from power source 42 to the multiple loads 12, 14, 16, and to load 17 where it is typically not economically feasible to provide auxiliary electrical power. As will be made clearer herein, the use of the power converters 46, 48, 50, 51 allow the topology of the system 40 to be rearranged in many different configurations and still be within the scope of the present invention provided that the configuration involves the use of a single electrical power generation source and power converters along with the utilities 18, 20 to provide power to multiple loads. It should be appreciated that this flexibility in this arrangement will facilitate the connection of loads such as load 17 connected to the auxiliary distribution bus 44 more cost effectively than provided hereto before. Also, as used herein, an electrical bus or node may be any point, line, or continuous section of common interaction between any two or more of power sources and loads such that the point, line, or continuous section has a common set of electrical characteristics, specifically voltage and for AC systems frequency and phase as well.

The generator 42 may be any type of distributed power generation device, including but not limited to electrical generators powered by hydrocarbon fueled (i.e. diesel, gasoline, propane or natural gas) internal combustion engines, hydrogen internal combustion engines, external combustion engines, Stirling engines, microturbines, steam turbines, gas turbines, flywheels, wind turbines, photovoltaic arrays, batteries, fuel cells, capacitors, super-capacitors and ultracapacitors. An optional control system 45 in the generator 42 may be included to monitor the operation of the generator 42 and alert the user in the event of a fault condition.

In the preferred embodiment, the power system 40 also reclaims the thermal energy Q produced by the generator 42 to provide heat for industrial processes or heating of the facility 10. The reclamation of thermal energy may be accomplished by any typical means, preferably through heat exchange with the cooling system or exhaust of generator 42 or through an absorption chiller. The thermal energy is typically transferred to the facility in the form of direct heat, hot water, or steam for process heating and/or cooling. It should also be appreciated that while the generator 42 as used herein is referenced as a singular, it is within the scope of the present invention that the generator 42 may be multiple power sources electrically coupled in parallel to provide electrical power to the distribution bus 44.

Each of the power converters 46, 48, 50, 51 convert the AC power provided by the generator 42 to match the electrical characteristics of the load it is supplying. In the exemplary embodiment the power converters 46, 48, 50, 51 are similar to that described in U.S. Pat. No. 6,693,409 entitled "Control system for a power converter and method of controlling operation of a power converter" which is incorporated herein by reference. The power converters 46, 48, 50, 51 may be of any type that can manage electrical characteristics such as, but not limited to, AC frequency, phase or voltage on either side of the converter and control the power flow at the same time. Preferably, the power converters 46, 48, 50, 51 will automatically and independently adjust the electrical characteristics of the asynchronous electrical power produced by generator 42 to be compatible with the connected load and utility. In addition the power converters 46, 48, 50, 51 preferably can control the reactive power on each side independently making possible some amount of voltage control on either side of the converter. This arrangement provides a number of advantages over the prior art systems in that this embodiment allows the generator 42 to operate in variable speed generator ("VSG") mode to achieve improved performance and efficiency at partial loads. The VSG mode allows for operation during step changes in the load demand and the utilization of the rotational inertia of the generator 42 in compensating for these step changes. Additionally, a single larger generator is often less costly to purchase and maintain than multiple smaller dedicated generators and the heat supply may be consolidated.

In a typical CHP application, the generator 42 will operate continuously to provide thermal energy and power to the facility 10 in parallel with the utilities 18, 20. Using a power converter such as that described in the aforementioned '409 patent in the system 40, the generator 42 can be operating continuously with the power converter providing electrical power to the loads automatically on an as needed basis. This configuration provides additional power quality protection for the loads 12, 14, 16, 17 against electrical faults on the utility 18, 20 such as low voltage conditions or so-called "brown-outs".

An alternate power converter arrangement is shown in FIG. 7. In some applications, it may be more cost effective to utilize two power converters instead of a single direct AC-AC power converter. Here, there power converter 100 is includes a first power converter 102 which converts the AC electrical power transmitted over the auxiliary distribution bus 44 from AC to DC. The DC electrical power is transmitted to a second converter 104 which converts the DC electrical power back into AC electrical power before being transmitted to the load 12. While this configuration may result in more components, it may allow for the use of lower cost converters in some applications. Additionally, it should be appreciated that while the power converters are shown as two separate components, it is contemplated that this conversion process may incorporate these converters into a single device which includes the intermediate DC stage of conversion.

Figure 9:
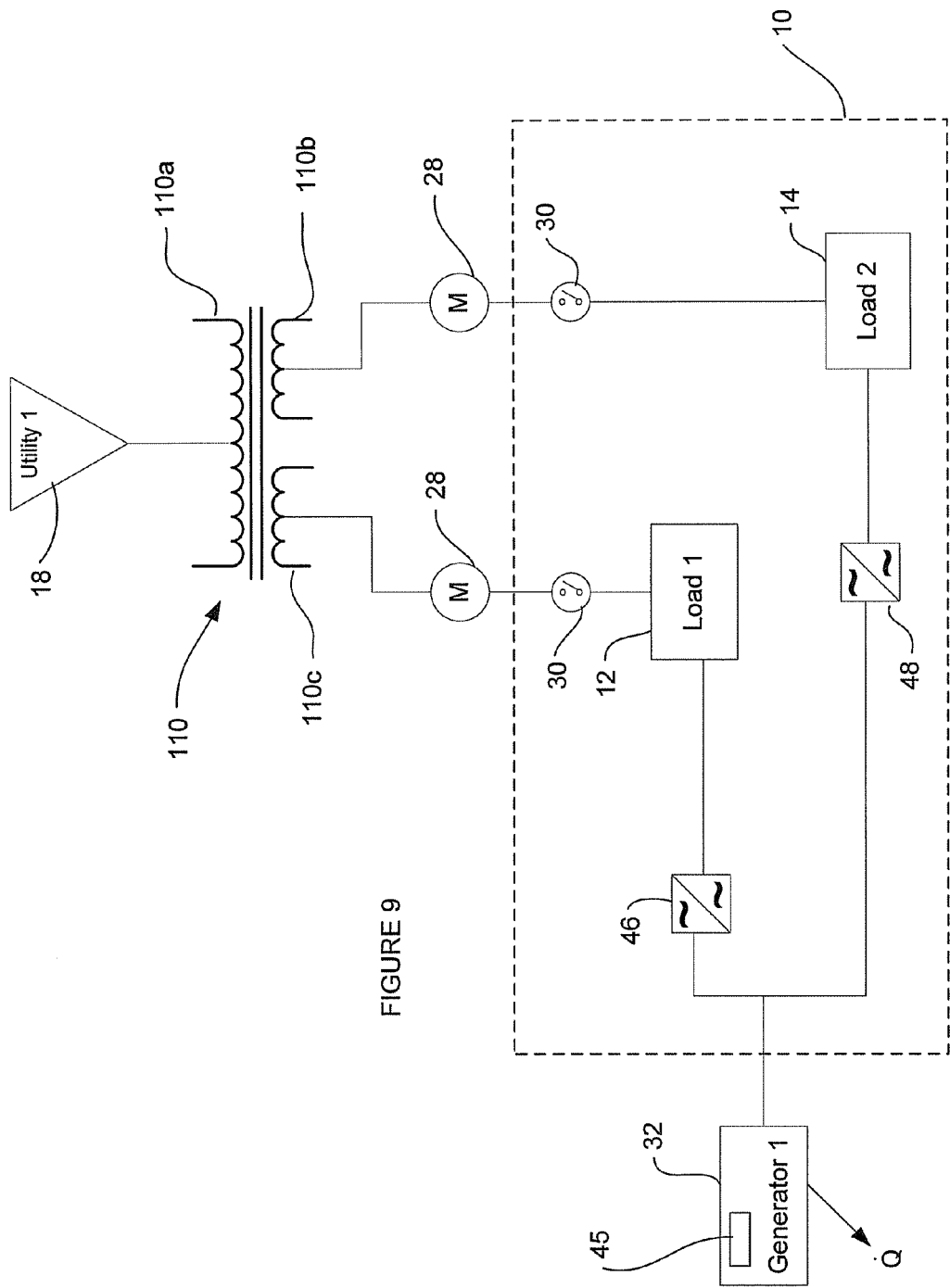
FIG. 9 is a schematic illustration of an alternate embodiment system having loads connected to separate transformer secondaries.

An alternate transformer arrangement is shown in FIG. 9. In this embodiment, the transformer 110 has a single primary winding 110*a* which is connected to the utility 18. The transformer 110 also has two secondary windings 110*b*, 110*c* which provide electrical power to the facility's 10 two loads 12, 14 respectively. It should be appreciated that even though the loads 12, 14 are receiving electrical power from the same transformer 110 primary 110*a*, differences in the secondary windings 110*b*, 110*c* and the impedances of loads 12, 14 result in sufficiently different electrical characteristics that make it impracticable to directly connect the loads 12, 14 to the same generator 32 without using the power converters 46, 48 as provided herein.

Figure 3:
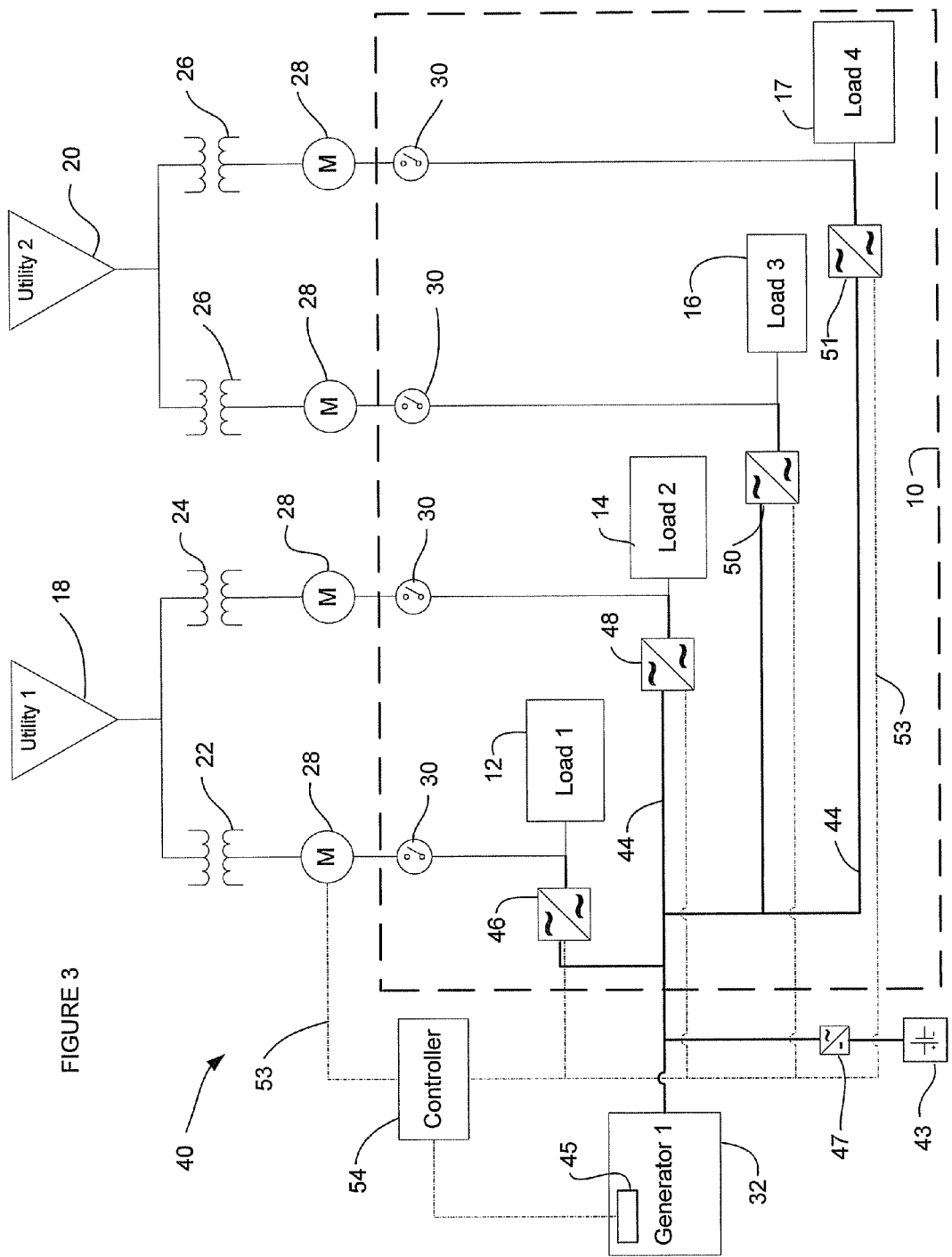
FIG. 3 is a schematic illustration of another alternate embodiment utilizing a electrical distribution bus to provide auxiliary electrical power throughout the facility.

An optional energy storage 43 may be coupled to the distribution bus 44 to provide additional power quality control as shown in FIG. 3. If the power system 40 is used in an auxiliary or back-up power application, the energy storage 43 could be used to provide electrical power to the distribution bus 44 while the generator 32 is initiated and accelerated to operational speed. The energy storage 43 may be any type of energy storage device such as, but not limited to, fly wheels, batteries, capacitors, super-capacitors and ultracapacitors. If the energy storage 43 produces electrical energy in direct current (DC) form, a power conversion device, or inverter 47 must also be used. It should be appreciated that the embodiments described herein are exemplary only and not meant to be limiting.

An optional data communications link 53 provides feedback control from the power converters 46, 48, 50, 51 to the optional controller 54. It should be appreciated by those skilled in the art that the communications link 53 may be a physical hardwired connection as shown, or any other means of communication such as, but not limited to computer networks, Ethernet, the internet, serial communications, a wireless networks, radio, infrared or the like. When utilized in a auxiliary or backup power application and electrical power at one of the loads 12, 14, 16, 17 is lost from the utilityies 18, 20. The power converter 46, 48, 50, 51 associated with the load 12, 14, 16, 17 suffering from the power loss communicates with the generator controller 54 which initiates the generator 42 and provides electrical power to the auxiliary distribution bus 52. Once the disconnect switch 30 associated with the load is opened, auxiliary electrical power is provided to the load. This auxiliary power will continue to provide power to the load until utility service 18, 20 is restored and disconnect switch 30 is closed. While this example referred to a loss of power at a single load 12, 14, 16,17 the operation is the same even if all four loads in the exemplary embodiment lose utility power at the same time. It should also be appreciated that the use of four loads within a facility in the exemplary embodiment is for example purposes only and that the arrangement for providing auxiliary power can have more or less loads supported by the generator 42 and is not intended to limit in the number of loads that may be connected to the auxiliary distribution bus 44.

Figure 4:
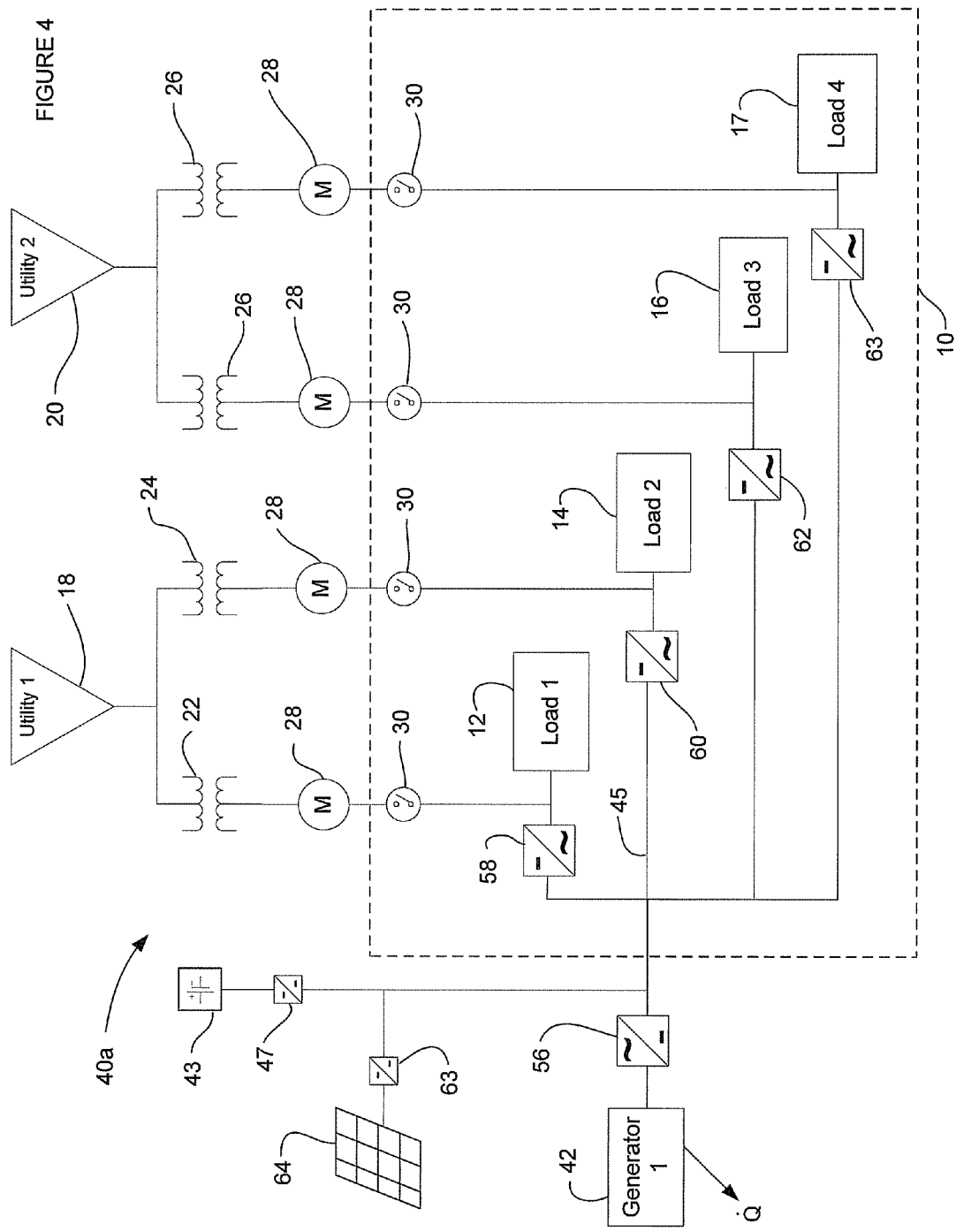
FIG. 4 is a schematic illustration of an alternate embodiment in FIG. 3 including a generator and a photovoltaic array arranged in parallel.

Another alternate embodiment power system 40a is shown in FIG. 4. In this embodiment, the generator 42 creates AC electrical power that is transmitted to a power converter 56 which converts the electricity from alternating current (AC) to direct current (DC) prior to distribution over the auxiliary distribution bus 44. A second set of power converters 58, 60, 62, 63 receive the DC electrical power from the distribution bus 44 and convert the electrical power back into AC electricity having the appropriate characteristics for their respective loads 12, 14, 16, 17. Using a DC auxiliary distribution bus 44 may provide a number of advantages over that used in the prior art, for example, if multiple mixed type power sources, such as generator 42, solar array 64 and energy storage 43, are used in parallel and connected to the distribution bus 44, the use of DC electrical power eliminates issues related to synchronization of the AC waveform between the respective power sources. Typically, the parallel power sources 43, 64 will require a power conversion device 47, 63 if the power sources are producing electricity at different power levels. In some applications this use of the DC distribution bus 44 may provide a more efficient means for combining the different sources while minimizing additional or more costly power conversion hardware.

In some applications, the use of the energy storage 43 in conjunction with the generator 32 may aid in maintaining power quality to the loads 12, 14, 16, 17. Alternatively, power quality may only be critical at a single load (e.g. a data center). In these applications, due to the cost of providing storage for the whole distribution bus 44, it may be desirable to connect the energy storage 106 to a single load 12 as shown in FIG. 8.

Figure 5:
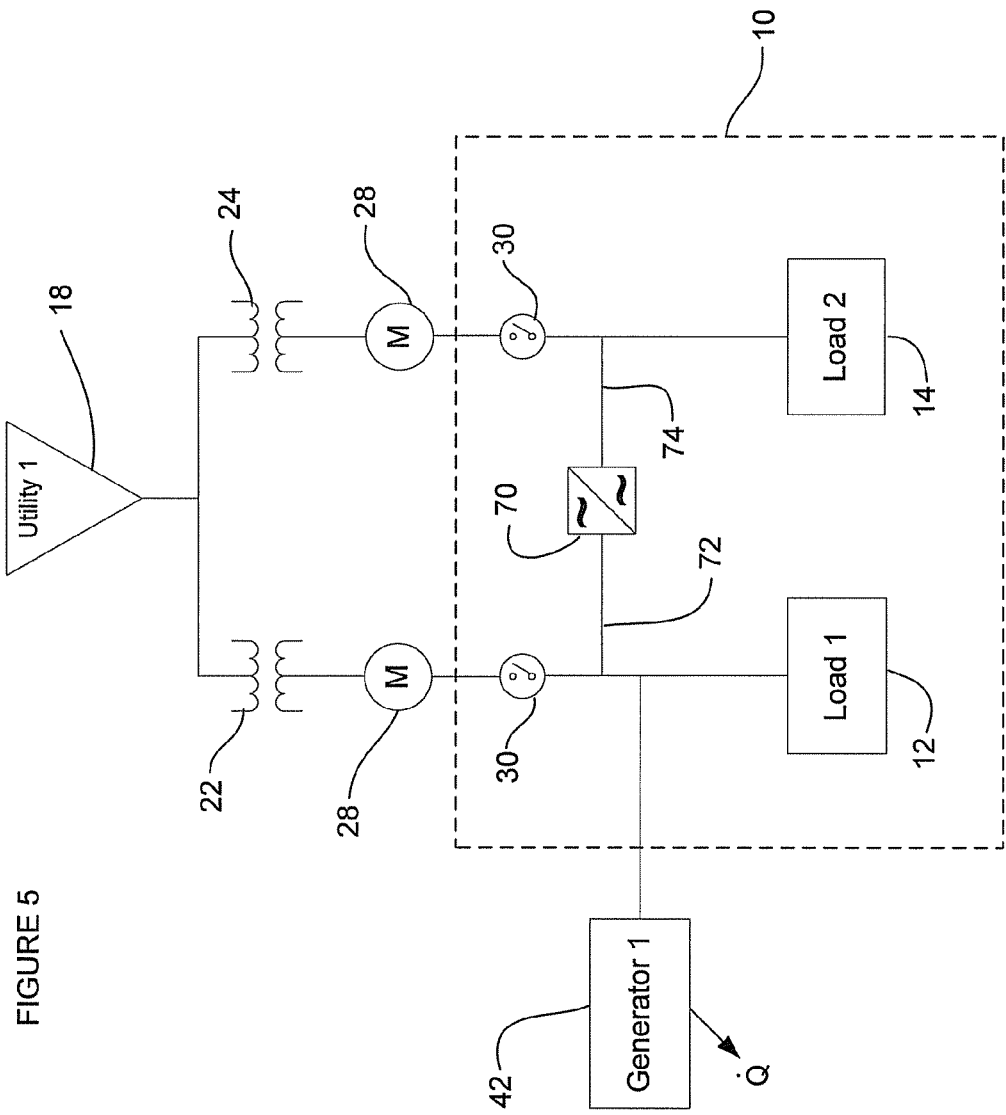
FIG. 5 is a schematic illustration of an alternate embodiment utilizing a separate utility service to provide auxiliary electrical power to a load on another utility service.

Another alternate embodiment for providing auxiliary electrical power is shown in FIG. 5. In this embodiment, a utility 18 provides power to loads 12, 14 through transformers 22, 24 respectively. A meter 28 and disconnect switch 30 are located between the transformers and the loads to provide electrical usage information to the utility and to allow isolation of the loads 12, 14. An optional auxiliary generator 42 is connected to provide power to the service and associated load 12.

A line 72 electrically connected to a load 12 connects to a power converter 70 which in turn electrically connects to load 14. This arrangement allows for the transfer of power from a electrical circuit feeding one of the loads 12, 14 to the other. The power converter 70 may be of any type that can manage AC frequency, phase or voltage on either side of the converter and control the power flow at the same time. In addition the power converter 70 can control the reactive power on each side independently making possible some amount of voltage control on either side of the converter.

In the event that electrical power from the utility 18 to one of the loads 12, 14 is lost, the disconnect switch 30 for the load which lost power is opened isolating the load from the utility. Electrical power from the other load is then allowed to flow through power converter 70 which converts the electricity to match the characteristics of the load. In the event that power is lost at both loads 12, 14 and the optional generator 42 is installed, the generator may provide electrical power to both loads 12, 14. This configuration provides a number of advantages in certain applications since it minimizes the number of connections and power converters 70 that are required.

Figure 6:
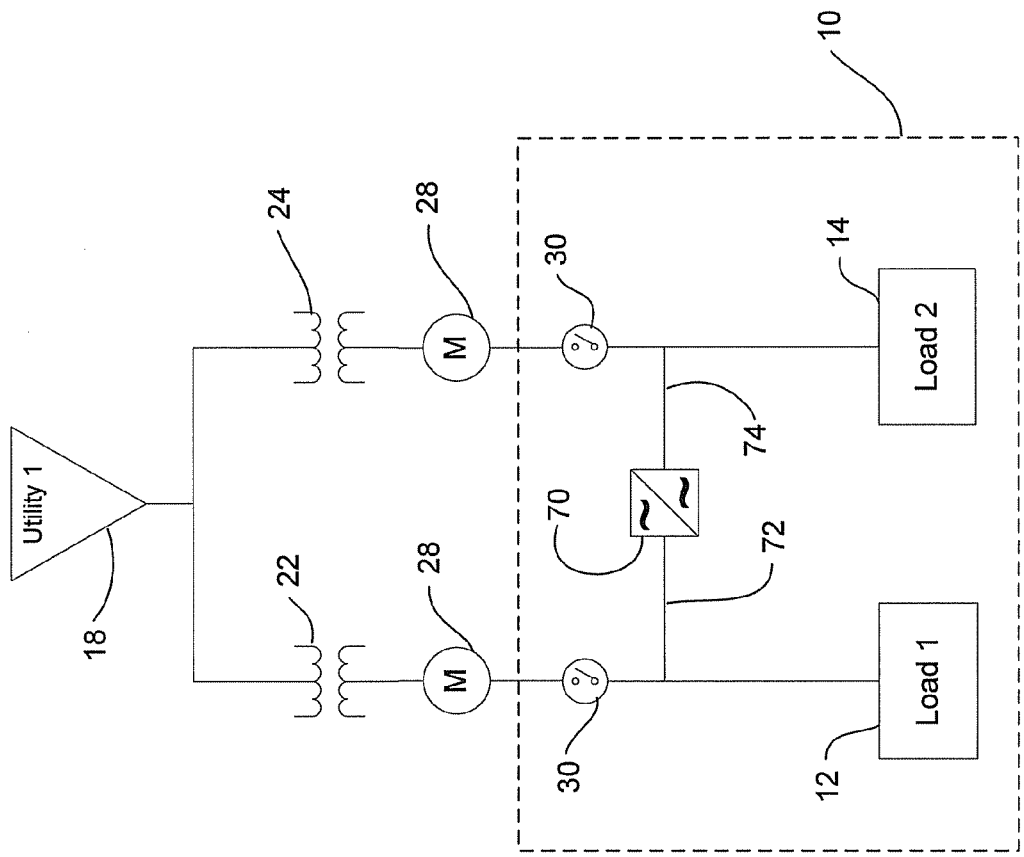
FIG. 6 is a schematic illustration of the alternate embodiment of FIG. 5 having primary power supplied by two independent utility services.

Another alternate embodiment is shown in FIG. 6. This embodiment shows a similar configuration as that shown in FIG. 5 with each of the loads 12, 14 being connected to separate and independent transformers 22, 24. This allows arrangement allows use for one electrical service as an auxiliary power source to increase reliability and uptime of the loads 12, 14 without the additional expense of a generator.

While the invention has been described with reference to a preferred embodiment, it will be understood by those skilled in the art that various changes may be made and equivalents may be substituted for elements thereof without departing from the scope of the invention. In addition, any modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. An electrical power system, comprising:
   at least one utility source of alternating current (AC) power;
   a plurality of transformer secondary windings in electrical communication with said at least one utility source;
   a plurality of AC power loads electrically connected to said plurality of transformer secondary windings so as to draw AC power from the at least one utility source via corresponding respective ones of said plurality of transformer secondary windings, said plurality of transformer secondary windings electrically connected to said plurality of transformer secondary windings at a plurality of corresponding respective plurality of electrical nodes;
   an AC generator for providing auxiliary AC power to ones of said plurality of AC power loads simultaneously with the AC power from said at least one utility source; and
   a plurality of AC-to-AC power converters electrically coupled between said AC generator and corresponding respective ones of said plurality of electrical nodes.

2. An electrical power system according to claim 1, wherein at least one of said plurality of AC-to-AC power converters comprises a pair of AC-to-direct current (DC) power converters linked by a DC link.

3. An electrical power system according to claim 2, further comprising a DC backup power supply electrically connected to said DC link.

4. An electrical power system according to claim 3, wherein said DC backup power supply comprises a DC storage device and a backup power generator.

5. An electrical power system according to claim 1, further comprising a transformer primary winding electrically coupled to said at least one utility source, at least two of said plurality of transformer secondary windings being electrically coupled to said transformer primary winding.

6. An electrical power system according to claim 1, comprising at least two utility sources of AC power, ones of said plurality of AC power loads electrically connected to corresponding respective ones of said at least two utility sources.

7. An electrical power system according to claim 1, wherein said AC generator is a cogeneration generator.

8. An electrical power system according to claim 1, wherein said plurality of AC electrical loads are located in a facility and said cogeneration generator provides direct thermal energy to the facility.

9. An electrical power system according to claim 1, wherein each of the plurality of AC-to-AC power converters has an input side and an output side and is configured to independently control reactance on each of said first and second sides.

10. An electrical power system according to claim 1, wherein each of said plurality of AC-to-AC power converters is configured to generate a signal when AC power from said at least one utility source to the corresponding one of said plurality of AC power loads experiences an electrical fault, the system further comprising a control system in operative communication with ones of said plurality of AC-to-AC power converters and said AC generator, said control system configured to control said AC generator as a function of ones of said signal.

11. An electrical power system according to claim 10, wherein said AC power generator is a variable speed generator.

12. An auxiliary alternating current (AC) power system for a facility containing a plurality of AC power loads, wherein at least one utility source of AC power provides AC power to the plurality of AC power loads through a plurality of corresponding respective transformer secondary windings and a plurality of corresponding respective electrical nodes located between corresponding respective ones of the plurality of corresponding respective transformer secondary windings and the plurality of AC power loads, the auxiliary power system comprising:
   an AC generator for providing auxiliary AC power to ones of the plurality of AC power loads simultaneously with the AC power from the at least one utility source;
   an auxiliary power distribution bus electrically connecting said AC generator to each of the plurality of AC power loads via said plurality of corresponding respective electrical nodes; and
   a plurality of AC-to-AC power converters electrically coupled in said auxiliary power distribution bus between said AC generator and corresponding respective ones of said plurality of electrical nodes.

13. An auxiliary AC power system according to claim 12, wherein at least one of said plurality of AC-to-AC power converters comprises a pair of AC-to-direct current (DC) power converters linked by a DC link.

14. An auxiliary AC power system according to claim 13, further comprising a DC backup power supply electrically connected to said DC link.

15. An auxiliary AC power system according to claim 14, wherein said DC backup power supply comprises a DC storage device and a backup power generator.

16. An auxiliary AC power system according to claim 12, wherein said AC generator is a cogeneration generator for providing direct thermal energy to the facility.

17. An auxiliary AC power system according to claim 12, wherein each of the plurality of AC-to-AC power converters has an input side and an output side and is configured to independently control reactance on each of said first and second sides.

18. An auxiliary AC power system according to claim 12, wherein each of said plurality of AC-to-AC power converters is configured to generate a signal when AC power from said at least one utility source to the corresponding one of the plurality of AC power loads experiences an electrical fault, the system further comprising a control system in operative communication with ones of said plurality of AC-to-AC power converters and said AC generator, said control system configured to control said AC generator as a function of ones of said signal.

19. An auxiliary AC power system according to claim 18, wherein said AC power generator is a variable speed generator.

20. An electrical power system, comprising:
a utility source of alternating current (AC) power;
a first transformer secondary winding in electrical communication with said utility source;
a second transformer secondary winding in electrical communication with said utility source;
a first AC power load electrically connected to said first transformer secondary winding at a first electrical node;
a second AC power load electrically connected to said second transformer secondary winding at a second electrical node;
a first disconnect switch electrically connected in series between said first transformer secondary winding and said first electrical node;
a second disconnect switch electrically connected in series between said second transformer secondary winding and said second electrical node; and
an AC-to-AC power converter electrically connected between said first and second electrical nodes.

21. An electrical power system according to claim 20, further comprising an AC generator electrically connected to said first electrical node.

22. An electrical power system according to claim 21, wherein said AC-to-AC power converter is operatively configured to control reactive power at each of said first and second electrical nodes.

23. An electrical power system according to claim 21, wherein said AC-to-AC power converter is operatively configured to condition electrical AC power from said AC power generator when each of said first and second disconnect switches are open and said AC power generator is operating.

24. An electrical power system according to claim 21, wherein said AC generator is a cogeneration generator for providing direct thermal energy to the facility.

25. An electrical power system according to claim 24, wherein, when the electrical power system is operating, said AC generator provides AC power to said first electrical node and said utility source provides AC power to said first electrical node simultaneously with one another.

26. An electrical power system according to claim 20, wherein said AC-to-AC power converter is operatively configured to control reactive power at each of said first and second electrical nodes.

27. A method of providing electrical power to multiple electrical loads, comprising:
receiving alternating current (AC) power from a utility grid and providing the AC power to first and second AC loads;
simultaneously with said receiving of AC power from the utility grid, providing AC power from an auxiliary AC power source to the first and second AC loads, wherein the AC power from the auxiliary AC power source is asynchronous relative to the utility grid;
adjusting the AC power to the first AC load from the auxiliary AC power source so as to be compatible with electrical characteristics of the first AC load and the utility grid; and
adjusting the AC power to the second AC load from the auxiliary AC power source to be compatible with electrical characteristics of the second AC load and the utility grid.

28. The method of claim 27, further comprising:
detecting a change in the electrical characteristics of the AC power provided by the utility grid to the first AC load; and
adjusting the AC power to the first AC load in response to the change.

29. The method of claim 28, further comprising adjusting the output of the auxiliary AC power source in response to the change.

30. The method of claim 28, further comprising adjusting the AC output of the auxiliary AC power source in response to a change in the first AC load.

31. The method of claim 27, farther comprising converting AC generated by the auxiliary AC power source to direct current.

32. The method of claim 31, further comprising converting the direct current back to AC before the power is adjusted to be compatible with the electrical characteristics of the first AC load and the utility grid.

33. The method of claim 27, further comprising:
receiving AC power from a second utility grid and providing it to a third AC load, wherein the AC power from the second utility grid is asynchronous with the AC power from the first utility grid;
providing AC power from the auxiliary AC power source to the third AC load; and
adjusting the AC power to the third AC load from the auxiliary AC power source so as to be compatible with the electrical characteristics of the third AC load and the second utility grid.

34. The method of claim 27, wherein the first and second AC loads are located in a facility having a thermal energy need and the auxiliary AC power source generates thermal energy, the method further including providing the thermal energy to the facility so as to at least partially satisfy the thermal energy need of the facility.

* * * * *

UNITED STATES PATENT AND TRADEMARK OFFICE
CERTIFICATE OF CORRECTION

| | |
|---|---|
| PATENT NO. | : 7,462,955 B2 |
| APPLICATION NO. | : 11/770148 |
| DATED | : December 9, 2008 |
| INVENTOR(S) | : McNamara et al. |

It is certified that error appears in the above-identified patent and that said Letters Patent is hereby corrected as shown below:

In column 10, claim 31, line 35, delete "farther" and insert -- further -- therefor.

Signed and Sealed this

Twenty-fourth Day of February, 2009

JOHN DOLL
*Acting Director of the United States Patent and Trademark Office*